(12) United States Patent
Chang et al.

(10) Patent No.: US 8,315,738 B2
(45) Date of Patent: Nov. 20, 2012

(54) MULTI-ARM ROBOT SYSTEM INTERFERENCE CHECK VIA THREE DIMENSIONAL AUTOMATIC ZONES

(75) Inventors: Tien L. Chang, Troy, MI (US); H. Dean McGee, Rochester Hills, MI (US); Ho Cheung Wong, Troy, MI (US); Jianming Tao, Troy, MI (US); Jason Tsai, Bloomfield Hills, MI (US)

(73) Assignee: Fanuc Robotics America, Inc., Rochester Hills, MI (US)

( * ) Notice: Subject to any disclaimer, the term of this patent is extended or adjusted under 35 U.S.C. 154(b) by 766 days.

(21) Appl. No.: 12/124,430

(22) Filed: May 21, 2008

(65) Prior Publication Data

US 2009/0326711 A1    Dec. 31, 2009

(51) Int. Cl.
*G05B 15/00* (2006.01)
(52) U.S. Cl. ........................................ 700/255; 700/248
(58) Field of Classification Search ........... 700/248–255
See application file for complete search history.

(56) References Cited

U.S. PATENT DOCUMENTS

| | | | |
|---|---|---|---|
| 5,150,452 A | 9/1992 | Pollack et al. | |
| 5,347,459 A * | 9/1994 | Greenspan et al. | 700/255 |
| 5,548,694 A * | 8/1996 | Frisken Gibson | 345/424 |
| 5,561,742 A | 10/1996 | Terada et al. | |
| 6,004,016 A * | 12/1999 | Spector | 700/56 |
| 6,678,582 B2 | 1/2004 | Waled | |
| 7,114,157 B2 | 9/2006 | Chaffee et al. | |
| 7,257,237 B1 * | 8/2007 | Luck et al. | 382/103 |
| 7,765,031 B2 * | 7/2010 | Nagamatsu | 700/255 |

* cited by examiner

*Primary Examiner* — John Q Nguyen
*Assistant Examiner* — Jordan S Fei
(74) *Attorney, Agent, or Firm* — Fraser Clemens Martin & Miller LLC; William J. Clemens

(57) ABSTRACT

A system and method for controlling avoiding collisions in a workcell containing multiple robots is provided. The system includes a sequence of instructions residing on a controller for execution thereon to perform an interference check automatic zone method. The interference check automatic zone method includes the steps of: determining a first portion of a common space that is occupied during a movement of a first robot along a first programmed path; determining a second portion of the common space that is occupied during a movement of a second robot along a second programmed path; comparing the first portion and the second portion to determine if an overlap exists therebetween; and moving the first robot and the second robot in response to whether or not the overlap exists.

20 Claims, 5 Drawing Sheets

MULTI-ARM ROBOT SYSTEM INTERFERENCE CHECK VIA THREE DIMENSIONAL AUTOMATIC ZONES

FIELD OF THE INVENTION

The present invention relates generally to a system for controlling a plurality of robots and a method for controlling motion interference avoidance for the plurality of robots.

BACKGROUND OF THE INVENTION

Movement of objects in space is a necessary task in a typical manufacturing environment. Robotics have increasingly been employed to effect the necessary movement. However, when multiple objects are being moved, a potential for interference between the objects exists. An interference exists if the at least two objects share the same space at the same time, such as when the objects have the same coordinates with respect to a common frame of reference.

As modern industrial robots move at considerable velocities, interferences between robots can result in a collision and undesirable damage to the robots and work pieces being handled by the robots. The collisions may lead to costly down time in the manufacturing process. Accordingly, it is desirable to avoid such collisions.

Prior art systems and methods have been used in an attempt to minimize interferences and collisions. However, there are several shortcomings of the prior art systems and methods. Typically, a tool center point (TCP) is only checked relative to a predetermined interference area or "static space". For multiple robots, it is difficult to directly or effectively prevent the collision or interference thereof. Further, it is difficult to specify an interference space in respect of a static coordinate system for multiple moving robots. Any interference space is not only a function of the robot motion path, but also a function of the motion speed. Difficulty also exists in attempting to handle a deadlock situation when two or more robots request to move to a common space at the same time.

Prior art systems also attempt to prevent a TCP for a robot from colliding in a fixed space relative to its world coordinate system. When multiple robots (with multiple controllers) share common or "interference" spaces during a task execution, each controller has to wait until no robot is in the common spaces. Then the controller can then issue the motion control commands to allow the robot to move. This process is also called a "wait and move" process, which generally increases working cycle time. However, it is difficult to effectively specify an interference space in terms of a fixed coordinate system, because the interference space is not only the function of the robot motion path but also the motion speed. When more than one robot requests to move to a common space at the same time, it creates a deadlock situation where none of the robots can move because they are waiting for one another.

Prior art systems also attempt to model the robot by spheres and cylinders. The systems predict a future location of the robot during motion in real time. Because the systems do not determine the accumulated space occupied by the robot over time, the systems must perform comparison frequently during the robot motion. The systems compare element by element the models of all robots in the workcell. This comparison is very expensive computationally and the cost grows exponentially as the number of robots and elements used to model a robot and tooling is increased. Since the comparison is done realtime when an impending collision is detected, the systems generally must stop all robots involved in the impending collision and automatic programmed operation must cease. The comparisons become more difficult when the robots reside on different controllers because they require large amounts of information to be communicated real-time between controllers. The prior art systems also attempt to utilize I/O handshaking mechanism for interference avoidance.

One known system and method is disclosed in Assignee's copending International Application No. PCT/US2007/066638, hereby incorporated herein by reference in its entirety. The system and method includes a "dynamic space check" system wherein an efficiency of robot operation is maximized and a potential for interference or collision of multiple robots is minimized. Robots controlled by each controller only work on a user-defined dynamic space, thus avoiding collision. However, the dynamic space check system generally protects a TCP only against a user-defined rectilinear space.

Another known method for avoiding robot collisions is reported in U.S. Pat. No. 5,150,452 to Pollack et al. The method includes creating a collision map containing a desired robot move. The initial position of the desired robot is removed from a "world" map by combining the robot map and the world map in a logical exclusive-OR operation and thereafter combining the collision map and the world map in a local exclusive-OR operation followed by combining the collision map and the world map in a logical inclusive-OR operation in a byte-by-byte manner. A collision is indicated by a difference in any bit position of the inclusive- and exclusive-OR combinations. The method provides a two dimensional x-y projection and one dimensional height for collision detection, but does not allow for three-dimensional, real time collision detection.

A further known method for detecting a collision between a robot and one or more obstacles before it occurs is described in U.S. Pat. No. 5,347,459 to Greenspan et al. The robot is modeled by spheres in a voxelized workspace. Each voxel within the workspace is assigned a value which corresponds to its distance from the closest obstacle, A collision is determined to be imminent if the voxel value at the center of a sphere is less than the radius of other sphere in voxels. The method merely protects a single robot arm, however. The robot is also modeled by spheres only, thereby resulting in insufficient protection of critical process paths of the robots There is a continuing need for a system and method for controlling motion interference avoidance for a plurality of robots. Desirably, the system and method provides a three dimensional and real time collision detection, communication of robotic motions to the robotic system in advance, reservation of programmed trajectories without collision, and protection of critical process paths.

SUMMARY OF THE INVENTION

In concordance with the instant disclosure, a system and method for controlling motion interference avoidance for a plurality of robots, wherein the system and method provides a three dimensional and real time collision detection, communication of robotic motions to the robotic system in advance, reservation of programmed trajectories without collision, and protection of critical process paths, is surprisingly discovered.

In one embodiment, a system for controlling collision avoidance in a workcell containing multiple robots includes at least one controller adapted for connection to a source of power. A sequence of instructions resides on the controller for execution thereon. The sequence of instructions includes an interference check automatic zone method. The system further includes a first robot in communication with and controlled by one of the at least one controllers. A second robot is also in communication with and controlled by one of the at least one controllers. The first robot and the second robot are configured to selectively occupy at least one common space within the workcell. The common space 10 can be manually specified by a set of parameters used to define the size, shape, and location of the common space 10, as desired.

In a further embodiment, a method of avoiding collisions in a workcell containing multiple robots comprises the steps of: providing at least one common space within the workcell that is selectively occupied by a first robot and a second robot; determining a first portion of the common space that is occupied during a movement of the first robot along a first programmed path; determining a second portion of the common space that is occupied during a movement of a second robot along a second programmed path; comparing the first portion and the second portion to determine if an overlap exists therebetween; and one of: moving only one of the first robot along the first programmed path and the second robot along the second programmed path, if there is overlap between the first portion and the second portion of the common space; and moving the first robot along the first programmed path and moving the second robot along the second programmed path, if there is no overlap between the first portion and the second portion of the common space.

In another embodiment, a method of avoiding collisions in a workcell containing multiple robots comprises the steps of: providing at least one common space within the workcell that is selectively occupied by a first robot and a second robot; determining a first portion of the common space that is occupied during a movement of the first robot along a first programmed path; representing the first portion as a first voxel model on a controller; determining a second portion of the common space that is occupied during a movement of a second robot along a second programmed path; representing the second portion as a second voxel model on a controller; comparing the first voxel model and the second voxel model to determine if an overlap exists therebetween; one of: moving only one of the first robot along the first programmed path and the second robot along the second programmed path, if there is overlap between the first voxel model and the second voxel model of the common space; and moving the first robot along the first programmed path and moving the second robot along the second programmed path, if there is no overlap between the first voxel model and the second voxel model of the common space; determining an unoccupied portion of the common space after at least one of the first robot has moved along the first programmed path and the second robot has moved along the second programmed path; and releasing the unoccupied portion of the common space for a further programmed path.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
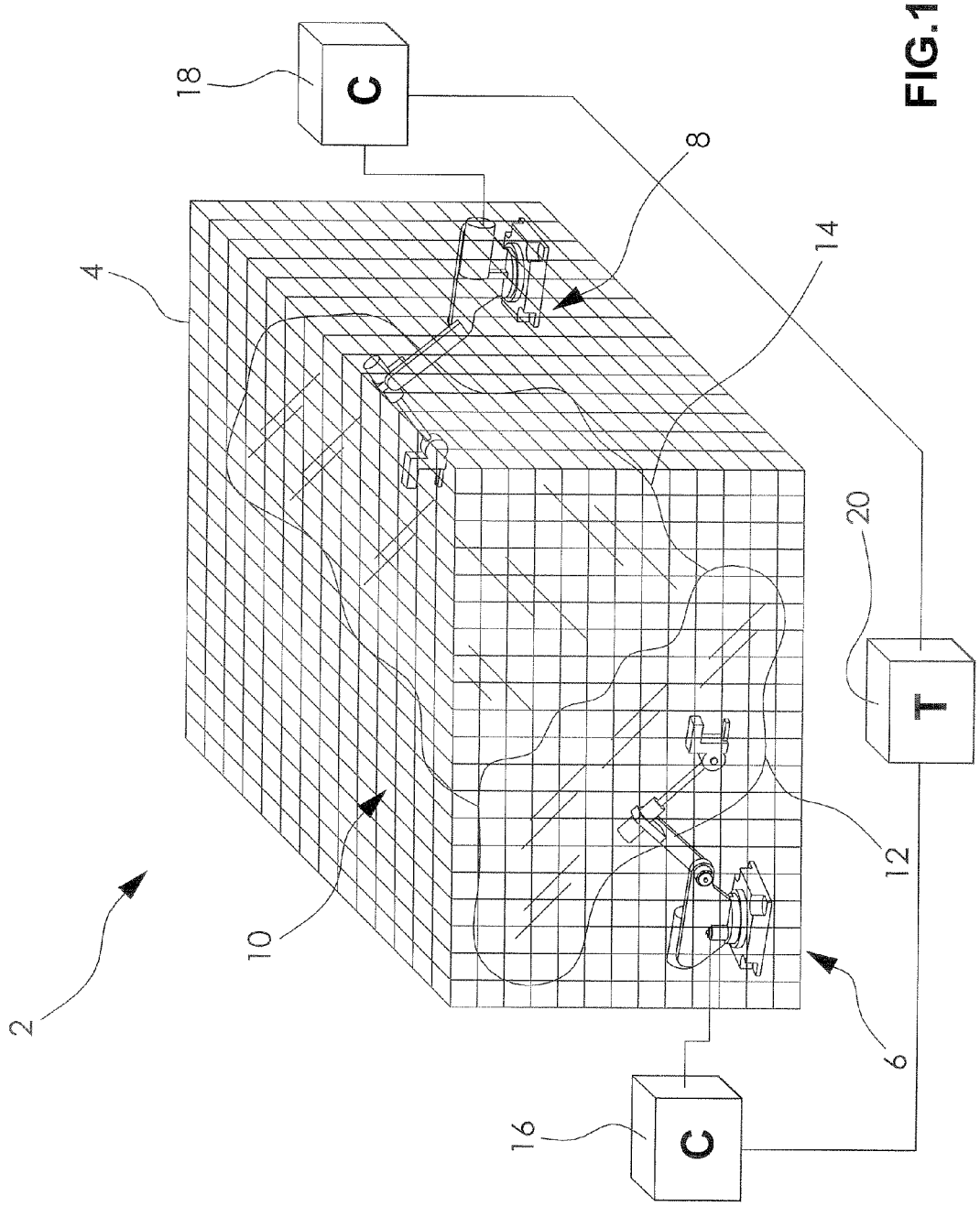
FIG. 1 shows an exemplary robotic system according to the present disclosure, having a first robot and a second robot operating within a workcell.

The following description is merely exemplary in nature and is not intended to limit the present disclosure, application, or uses. It should be understood that throughout the drawings, corresponding reference numerals also indicate like or corresponding parts and features. In respect of the methods disclosed, the steps presented are exemplary in nature, and thus, are not necessary or critical.

FIG. 1 is a schematic diagram showing a robotic system 2 for controlling collision avoidance between multiple robots. As nonlimiting examples, the robotic system 2 may be one of a body shop robot system, a waterjet cutting robot system, a laser welding robot system, an arc welding robot system, and a paint robot system having at least two robots. Other robotic systems 2 having a plurality of robots may also be employed, as desired.

The robotic system 2 includes a work cell 4 defining an envelope within which a first robot 6 and a second robot 8 are configured to operate. The first robot 6 and the second robot 8 are configured to selectively occupy at least one common space 10 disposed within the work cell 4. Although only a first robot 6 and a second robot 8 are illustrated, it should be appreciated that the robotic system 2 may have more than two robots without departing from the scope and spirit of the disclosure.

The first robot 6 may occupy a first portion 12 of the common space 10 during a movement of the first robot 6 along a first programmed path. The second robot 8 may occupy a second portion 14 of the common space 10 during a movement of the second robot 8 along a second programmed path. The first and second portions 12, 14 are also known as "automatic zones" or "autozones". Each programmed path comprises one or more automatic zones, and each automatic zone is pre-processed and derived from one or more motion statements, for example. The first and second programmed paths may be controlled by one or more motion statements in a sequence of instructions having multiple motion statements, for example. A skilled artisan should understand that the first and second portions 12, 14 may overlap, thus resulting in a likelihood of robot collision absent the employment of an interference avoidance method for controlling the motions of the first and second robots 6, 8.

The first and second robots 6, 8 are controlled by at least one controller 16, 18. In the embodiment shown in FIG. 1, the first robot 6 is controlled by the first controller 16 and the second robot 8 is controlled by the second controller 18. The at least one controller 16, 18 is adapted for electrical communication with a source of electrical power (not shown). The controller 16, 18 can execute the sequence of instructions, such as a computer program, residing within the controller 16, 18. In other embodiments, the sequence of instructions may reside on a computer-readable medium or memory in communication with the controller 8.

The robotic system 2 may further include other components known in the art, such as at least one of network media (not shown) configured to connect the various system 2 components, a programmable logic device (not shown), and a teaching device 20 in electrical communication with the at least one controller 16, 18. In a particular embodiment, the teaching device 20 may include a monitor and is configured to graphically represent the first robot 6, the second robot 8, the first portion 12 of the common space 10, and the second portion 14 of the common space 10 for viewing by an operator of the robotic system 2, as desired. The teaching device 20 may include means for initiating a sequence of instructions to jog the robot, as desired.

Figure 2:
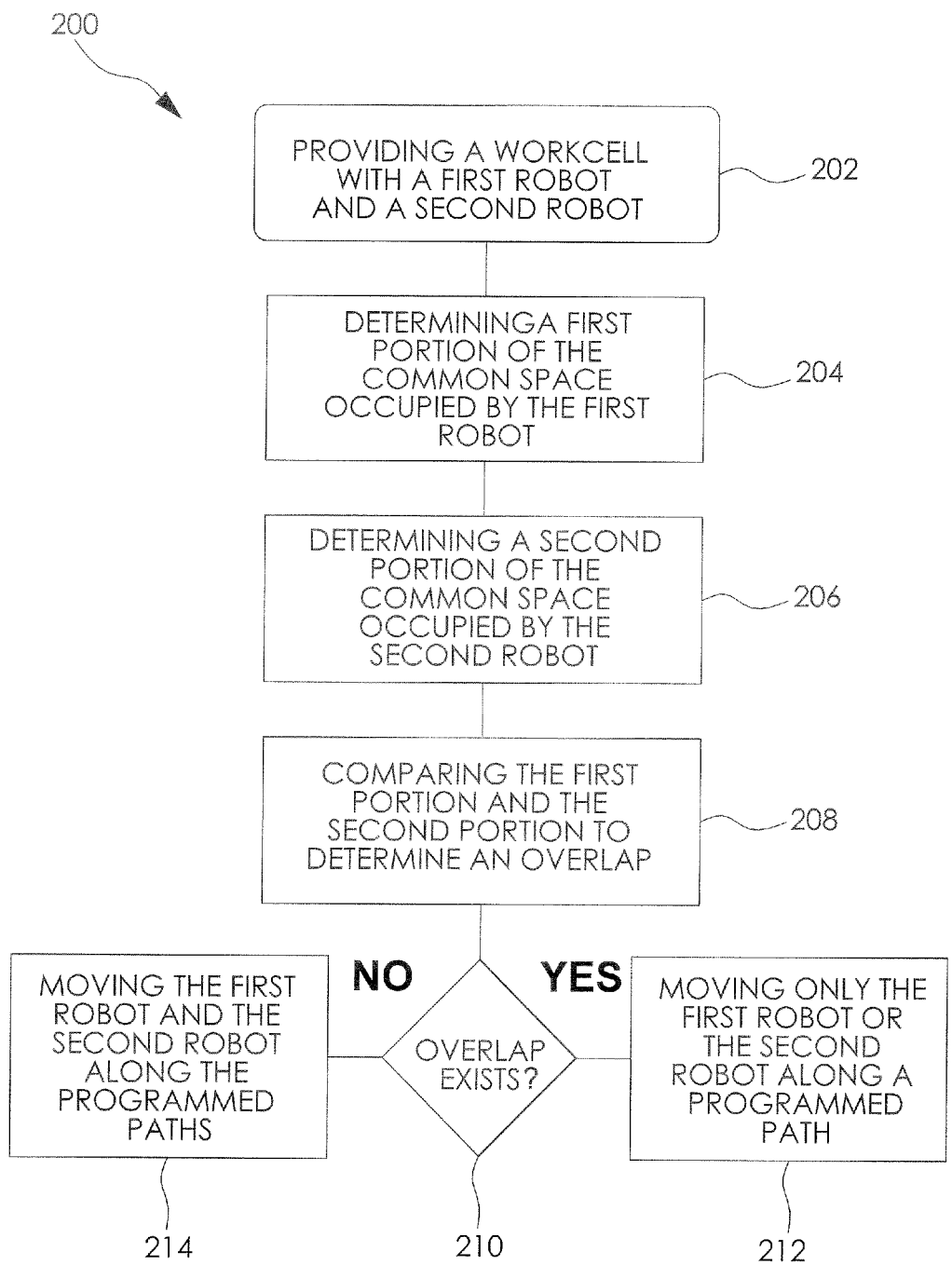
FIG. 2 is a process flow diagram depicting an interference check automatic zone method according to the present disclosure.

An exemplary sequence of instructions according to the present disclosure is shown in FIG. 2. The sequence of instructions includes an interference check automatic zone method 200. The interference check automatic zone method 200 first includes an initial step 202 of providing the at least one common space 10 within the workcell 4. The initial step 202 is followed by a first determination step 204 and a second determination step 206. The first determination step 204 includes determining the first portion 12 of the common space 10 that is occupied during the movement of the first robot 6 along the first programmed path. The second determination step 206 includes determining the second portion 14 of the common space 10 that is occupied during the movement of the second robot 8 along the second programmed path. It should be appreciated that the first and second portions 12, 14 may be determined automatically, i.e., without necessitating a user specified zone of operation for each robot, as is known in the art. The first portion 12 and the second portion 14 are then compared in a comparison step 208 to determine if an overlap 210 exists therebetween.

As a nonlimiting example, the first and second determination steps 204, 206 may be conducted in substantially real time during an initial operation of the robotic system 2 with the first and second robots 6, 8. The initial operation may be conducted with the first and second robots 6, 8 in a lockdown mode to avoid any potential collisions thereof. In another example, the first and second determination steps 204, 206 may be conducted by performing offline runs of the first and second programmed paths, for example, to identify the first and second portions 12, 14 of the common space 10 that may be occupied by the robots 6, 8 during the real time operation. The first and second portions 12, 14 identified during the first and second determination steps 204, 206 may further be retained on the memory, for example, and reused during subsequent operations of the first and second robots 6, 8. It should be understood that the programmed paths or trajectories of the robots' 6, 8 motion is thereby pre-processed and reserved to militate against a collision thereof.

First and second movement steps 212, 214 for the first and second robots 6, 8 are selected in response to the existence of the overlap 210. If there is the overlap 210 between the first portion 12 and the second portion 14, collision of the robots 6, 8 is deemed likely and the first movement step 212 is selected. The first movement step 212 includes moving only one of the first robot 6 along the first programmed path and the second robot 8 along the second programmed path. If there is no overlap 210 between the first portion 12 and the second portion 14, collision of the robots 6, 8 is deemed unlikely and the second movement step 214 is selected. The second movement step 214 includes moving the first robot 6 along the first programmed path and moving the second robot 8 along the second programmed path.

The first and second determination steps 204, 206 may be conducted by any means known in the art. In one particular embodiment according to the present disclosure, the first and second determination steps 204, 206 may include the step of representing at least one of the common space 10, the first portion 12, and the second portion 14 with at least one voxel model 300 having at least one voxel 302, such as is illustratively shown in FIGS. 3 to 6. The voxels 302 are volume elements that represent value on a regular grid in a three dimensional space. The comparison step 208 may include the step of determining whether the overlap 210 exists between a first voxel model 300 representing the first portion 12 and a second voxel model 300 representing the second portion 14, for example. The voxel model 300 is generally represented by the plurality of voxels 302 that approximate a shape of various components, such as a base, an arm, and a tool, of the first and second robots 6, 8.

Figure 3:
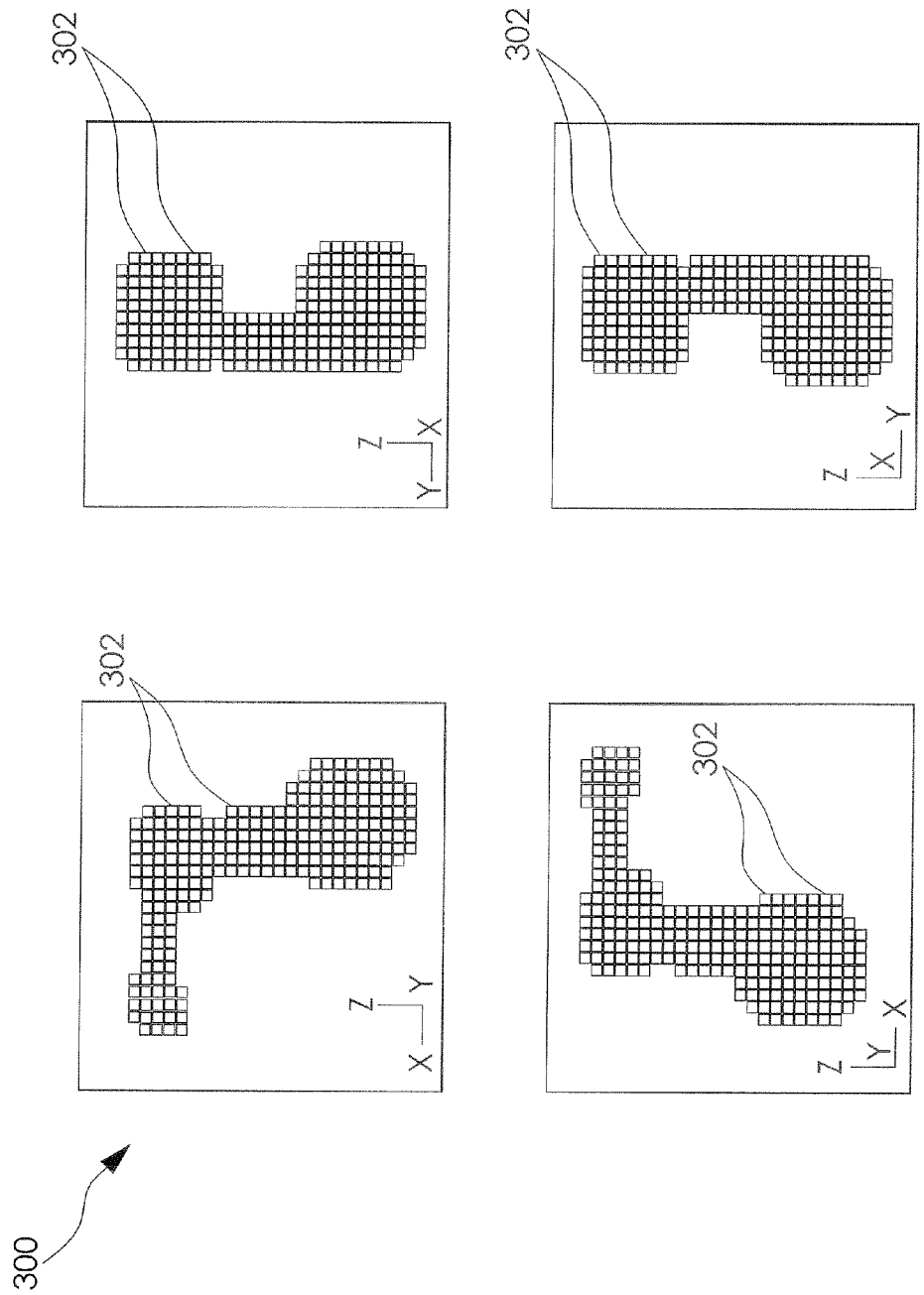
FIG. 3 shows a voxelized model of one of the first robot and the second robot depicted in FIG. 1.
Figure 4:
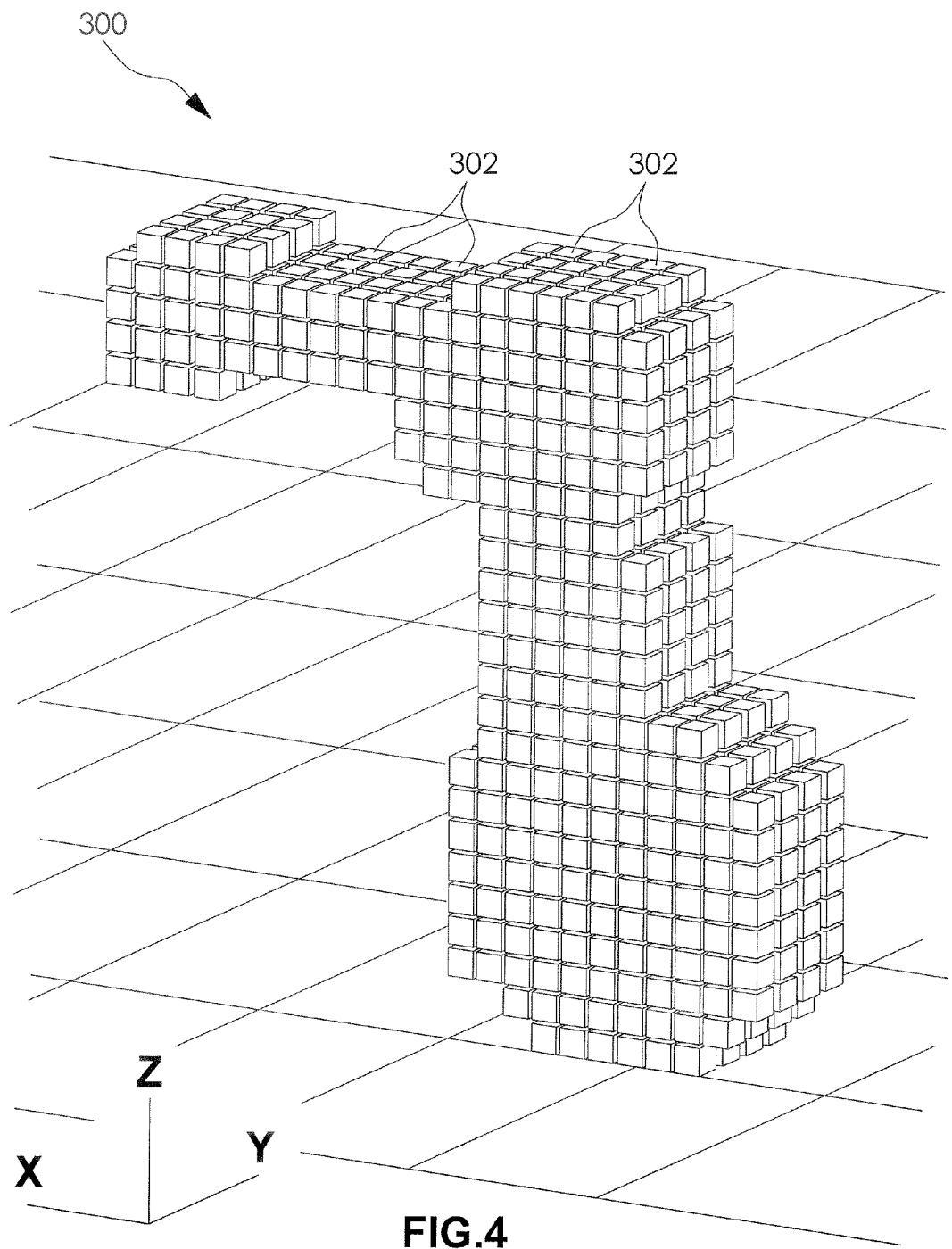
FIG. 4 is an isometric view of the voxelized model depicted in FIG. 3.

With reference to FIGS. 3 and 4, an illustrative voxel model 300 may include a plurality of voxels disposed at coordinates along an X-axis, a Y-axis, and a Z-axis. The voxel model 300 is configured to depict a three dimensional volume of the common space 10 that is occupied by at least one of the first robot 6 and the second robot 8. The voxel model 300 may be in the form of a data file generated and saved to the controller 16, 18 or to another computer readable medium or memory, for example. In certain embodiments the voxel model 300 is dynamic and includes a plurality of voxel models 300 associated with a sequence of the robotic movements. The dynamic voxel model 300 may be employed to depict the three dimensional volume of the common space 10 that is occupied during the movements of at least one of the first robot 6 and the second robot 8. Each automatic zone may be derived from an accumulation and/or superimposition of multiple snapshots of the voxel models 300, each snapshot taken at one or more interpolation intervals, for example.

Figure 5:
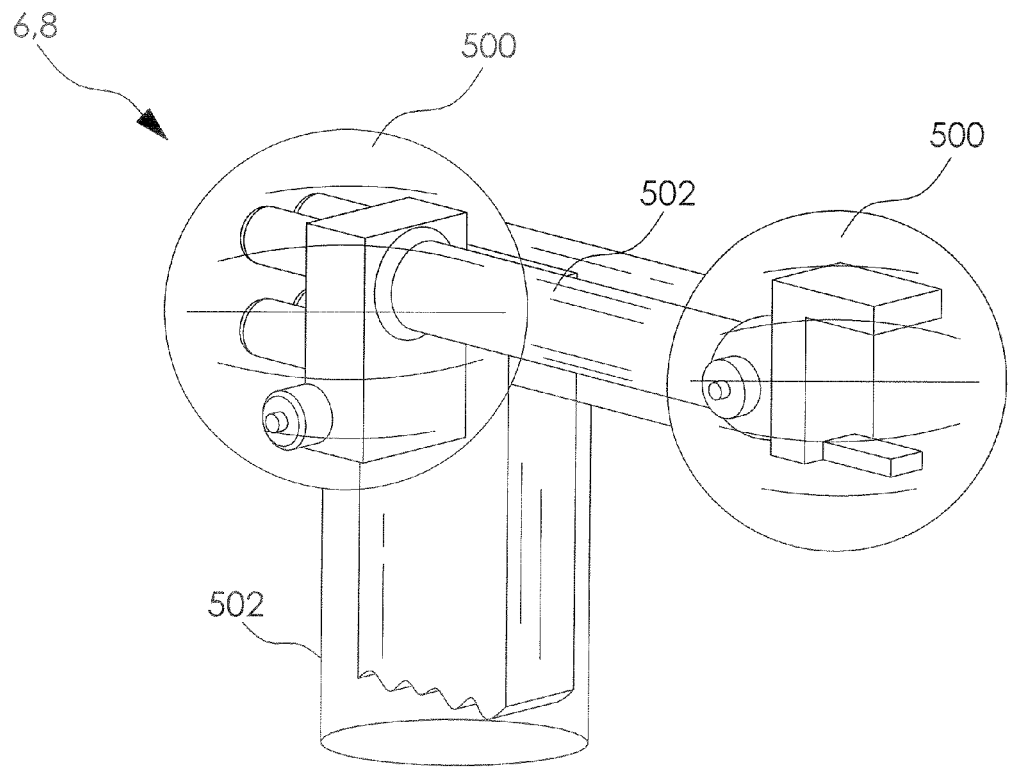
FIG. 5 shows an enlarged view of one of the first robot and the second robot depicted in FIG. 1, having a voxelized model formed by voxelized spheres and cylinders overlayed on one of the first robot and the second robot.
Figure 6:
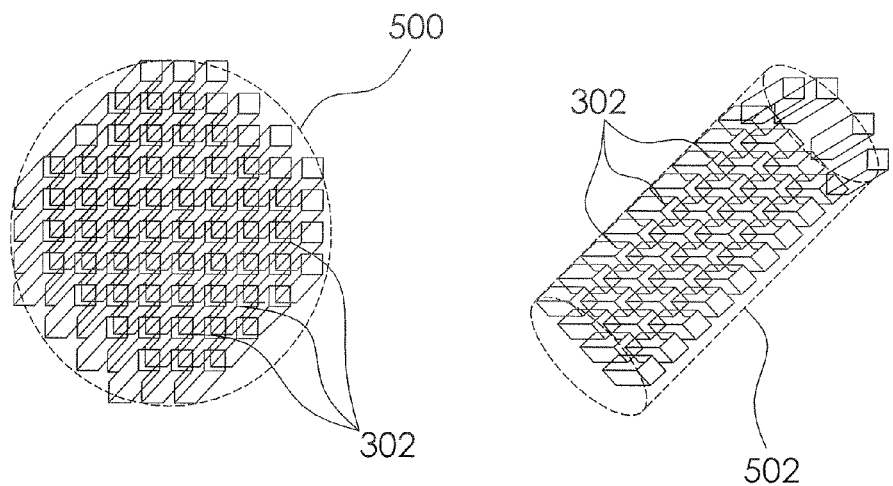
FIG. 6 shows the voxelized spheres and the voxelized cylinders depicted in FIG. 5, formed from a plurality of voxels.

Referring now to FIGS. 5 to 6, the voxel models 300 of the first and second robots 6, 8, may include at least one a voxelized sphere 500 and a voxelized cylinder 502 to represent the three dimensional volume occupied by the first and second robots 6, 8. As described further herein, the voxelized spheres 500 and the voxelized cylinders 502 may represent the various components, such as a base and an arm, of the first and second robots 6, 8. The voxelized spheres and cylinders 500, 502 generally include the plurality of voxels 302 disposed relative one another to approximate the general shapes and boundaries of the first and second robots 6, 8.

One of ordinary skill in the art should understand that the voxelized spheres 500 and cylinders 502 may be generated by any suitable means. For example, the voxelized sphere may 500 may be approximated by first projecting an exemplary sphere representative of the robot 6, 8 components onto an X-Y plane. A smallest cylinder A that encloses the sphere is then identified. The same sphere is then projected onto a Y-Z plane and the smallest cylinder B that encloses the sphere is identified. The same sphere is then projected onto a Z-X plane, and the smallest cylinder C that encloses the sphere is identified. The voxelized sphere 500 is then approximated by identifying the intersections of A, B, and C cylinders.

In another embodiment, the voxelized sphere 500 may be approximated by first finding a smallest box that encloses a sphere representative of the robot 6, 8 component. The box has a volume occupation A. The voxel volume occupation B that is inside the box A and outside the sphere is then identified. The voxelized sphere 500 is then approximated by subtracting the volume B from the volume A.

The voxelized sphere 500 may alternatively be approximated by identifying an intersection of the exemplary sphere and the X-Y plane. The intersection includes the center of the sphere along the Z axis and forms an intersected circular plate A1. The circular plane A1 is assigned an arbitrary height and the voxel occupation of the intersected circular plate A1 is subsequently identified. Further circular plates A2, A3 . . . A(n), are located by shifting the intersection of the exemplary sphere and the X-Y plane along the Z axis, and the volume occupations thereof are likewise identified. The voxelized sphere 500 is then approximated by integrating each of the voxel occupations identified for the circular plates of the exemplary sphere.

The voxelized cylinder 502 may be approximated by identifying a left hemisphere/whole sphere voxel occupation A, identifying a right hemisphere/whole sphere voxel occupation B, and identifying a voxel occupation C of multiple circular plates between the left and the right hemispheres. A base circular plate which is perpendicular to a base line is then created. The base line connects the two hemispheres at the ends of the cylinder. Subsequent circular planes can be derived by shifting the base circular plate along a Z axis. Alternatively, a voxel occupation of the base line may be calculated, and the base line subsequently shifted to fill the entire area between the two hemispheres. The voxelized cylinder 502 is subsequently approximated by integrating each of the A, B, and C voxel occupations.

An alternative method for approximating the voxelized cylinder 502 includes first identifying a smallest box that may enclose an exemplary cylinder representative of the robot 6, 8 component. The box has a volume occupation A. A voxel volume occupation B that is inside the box and outside the cylinder is then identified. The voxelized cylinder 502 is subsequently approximated by subtracting the voxel occupation B from the voxel volume occupation A. One of ordinary skill in the art should understand that other means suitable for approximating the voxelized spheres 500 and cylinders 502 representative of the robot 6, 8 components may be employed as desired.

Voxelization may also be determined similarly from any arbitrary CAD surface or volume which can represent the robot 6, 8, a robot arm, a dressout, and a tooling, for example.

Voxelization is a very efficient method of representing the common space 10 occupied by a robot motion segment, The voxelization process has some computational overhead to create the voxelized space, but the run-time component is very efficient. Once a space is voxelized, the maximum storage requirement of a voxelized space is fixed, no matter how complex or how much of the common space is occupied by the robot during the motion path, The run-time checking for interference between voxelized spaces is very efficient. Although the preferred embodiment provides for the interference check automatic zones 12, 14 to be represented by voxelized regions, any method of volumetric or surface representation of the space occupied by the robots 6, 8 during a motion path can be used.

Further embodiments avoid collision during programmed motion, motion initiated by jogging, or motion initiated by other means. A moving robot 6, 8 may also be protected from colliding with a stationary robot 6, 8 or with other fixed objects or other defined regions in the workcell 4. For programmed motion the voxelization process, or other interference check automatic zone modeling process, can take place during offline or during a test run and the voxelized data efficiently stored for later retrieval. This process can also occur real-time as a new motion path is determined as from a new program, robot 6, 8 jogging, or from motion initiated by other means. For these cases the sequence of instructions may be determined by use of the teaching device 20 or by the other means which initiates the motion. The actual motion is not allowed to commence until the process is completed and no interference with this interference check automatic zone and other occupied interference check automatic zones.

In further embodiments, at least one of the first portion 12 and the second portion 14 of the common space 10 may include at least one of a tooling space and a dressout assembly, such as an ArcTool wire feeder, occupied by a tooling attached to at least one of the first robot 6 and the second robot 8. The step of determining the overlap 210 also may include comparing at least one of the first portion 12 and the second portion 14 with a third portion of the common space 10 that occupied by a non-robot obstacle (not shown). The obstacle can be manually specified by a set of parameters used to define the size, shape, and location of the common space 10, as desired. In another example, the method 200 may further include the step of determining the third portion of the common space 10 occupied by the obstacle. It should be understood that the third portion of the common space occupied by the non-robot obstacle may also be represented by voxels 302 in a similar voxel model 300, as desired.

The method 200 of the present disclosure may further include the step of determining an unoccupied portion of the common space 10 after at least one of the first robot 6 has moved along the first programmed path and the second robot 8 has moved along the second programmed path. The unoccupied portion of the common space 10 may then be released for use by another robot following a further programmed path or trajectory, as desired. In a further embodiment, the method 200 may include the step of transferring the coordinates of the first portion 12 and the second portion 14 of the common space 10 to the at least one controller 16, 18 for further use according to the method 200 of the present disclosure. The controller 16, 18 may then be employed to conduct at least one of the first and second determination steps 204, 206 as described herein, and convert the coordinates into the voxel models 300 representative of the first and second portions 12, 14.

A skilled artisan should appreciate that, upon determining whether the overlap exists between the first and second portions 12, 14 of the common space 10, the respective movements of the first robot 6 and the second robot 8 may determined by priority values. As a nonlimiting example, the priority values of the first and second robots 6, 8 may be based on a first-in-first-out system. In another example, one of the first and second robots 6, 8 may always have a higher priority value than the other of the first and second robots 6, 8. The higher priority value may be based on a predetermined user setting for priority of the robots 6, 8 in the robotic system 2. In a further example, the priority values may be selected based on the availability of unoccupied portions within the common space 10. A skilled artisan may assign the desired priority values to the first and second robots 6, 8, as desired.

In a further embodiment, the method 200 further includes the step of analyzing the plurality of programmed paths for the existence of the overlap 210 that may result in a deadlock condition. An operating sequence of the plurality of programmed paths may subsequently be adjusted, as desired, to militate against the occurrence of the deadlock condition. The operating sequence may be adjusted manually or automatically, for example, based on priority values, as desired.

It should be appreciated that the interference check automatic zone system 2 and method 200 of the present disclosure advantageously provides a competitive advantage over conventional multi-arm robotic systems. The system 2 and method 200 provides a three dimensional and real time collision avoidance. The system 2 requires minimal programming because the system 2 militates against the need of specifying or teaching interference zones. Production down-time is also thereby reduced.

One of ordinary skill in the art should also appreciate that the employment of voxelized spheres 500 and cylinders 502 minimizes processing requirements typically associated with generation of robotic models. Movements of the first and second robots 6, 8 are communicated to the system 2 in advance, for example, by offline generation of the voxel models 300. Likewise, programmed paths or trajectories of the first and second robots 6, 8 are reserved without collision. A process path is a sequence of motions during which an application process, such as cutting, welding, grinding, routing, painting, dispensing, or another similar processes takes place. It is generally important that once a process path is started the entire process path be completed without interruption. It should also be appreciated that critical process paths of the first and second robots 6, 8 are likewise protected according to the present method 200.

The system 2 supports multiple robot arm collision avoidance within the same controller 16, 18 and across multiple controllers 16, 18, as desired. The system 2 and method 200 further provides for a simplified robot configuration and militates against the need for an I/O handshaking protocol, as is conducted with certain prior art systems and methods. The interference check automatic zone system 2 and method 200 simplifies the configuration of multiple arm interference checks and militates against multiple robot arm deadlock.

While certain representative embodiments and details have been shown for purposes of illustrating the invention, it will be apparent to those skilled in the art that various changes may be made without departing from the scope of the disclosure, which is further described in the following appended claims.

What is claimed is:

1. A system for controlling collision avoidance in a workcell containing multiple robots, comprising:
    a controller adapted for connection to a source of power;
    a first sequence of instructions residing on the controller for execution thereon, the first sequence of instructions including an interference check automatic zone method;
    a first robot in communication with and controlled by the controller for movement in accordance with the first sequence of instructions;
    a second robot in communication with and controlled by the controller or another controller for movement in accordance with a second sequence of instructions, wherein the first robot and the second robot are configured to selectively occupy at least one common space within the workcell; and
    wherein the interference check automatic zone method forms for each of the first and second robots a separate voxel model representing a volume of the common space occupied by an associated one of the first and second robots during movement of the first and second robots in accordance with the first and second sequence of instructions respectively, wherein the common space is represented by a voxel model and has both an occupied portion defined by the volume of the common space occupied by the separate voxel models of the first and second robots and an unoccupied portion defined by a volume of the common space not occupied by the separate voxel models of the first and second robots, and wherein voxels of the separate voxel models are voxels in the voxel model of the common space.

2. The system of claim 1, wherein the sequence of instructions comprises the steps of:
    determining a first portion of the common space that is occupied during a movement of the first robot along a first programmed path as the separate voxel model for the first robot;
    determining a second portion of the common space that is occupied during a movement of a second robot along a second programmed path as the separate voxel model for the second robot;
    comparing the voxels of the first portion to the voxels of the second portion of the common space to determine if an overlap exists between the first portion and the second portion; and
    one of:
        moving only one of the first robot along the first programmed path or the second robot along the second programmed path, if there is overlap between the first portion and the second portion of the common space; and
        moving the first robot along the first programmed path and moving the second robot along the second programmed path, if there is no overlap between the first portion and the second portion of the common space.

3. The system of claim 1, further comprising a teaching device in electrical communication with the controller and configured to graphically represent the first robot, the second robot, a first portion of the common space, and a second portion of the common space for an operator, wherein the first and second sequence of instructions are generated through the use of the teaching device to jog the first robot and the second robot.

4. The system of claim 1, wherein the first robot and the second robot are attached to a single robot controller.

5. The system of claim 1, wherein the first robot is attached to a first robot controller and the second robot is attached to a second robot controller.

6. The system of claim 1, wherein the workcell includes a plurality of common spaces, the first robot and the second robot configured to selectively occupy each of the common spaces.

7. A method of avoiding collisions in a workcell containing multiple robots, the method comprising the steps of:
    providing at least one common space within the workcell that is selectively occupied by a first robot and a second robot;
    determining a first portion of the common space that is occupied during a movement of the first robot along a first programmed path as a first voxel model;
    determining a second portion of the common space that is occupied during a movement of a second robot along a second programmed path as a second voxel model, wherein the common space is represented by a voxel model and has both an occupied portion defined by the volume of the common space occupied by the first and second voxel models of the first and second robots and an unoccupied portion defined by a volume of the common space not occupied by the first and second voxel models of the first and second robots, and wherein voxels of the first and second voxel models are voxels in the voxel model of the common space;
    comparing the first portion voxels and the second portion voxels to determine if an overlap exists therebetween; and
    one of:
        moving only one of the first robot along the first programmed path or the second robot along the second programmed path, if there is overlap between the first portion and the second portion of the common space; and moving the first robot along the first programmed path and moving the second robot along the second programmed path, if there is no overlap between the first portion and the second portion of the common space.

8. The method of claim 7, wherein the common space, the first portion, and the second portion are each represented by a voxel model.

9. The method of claim 7, further comprising the step of determining an unoccupied portion of the common space after at least one of the first robot has moved along the first programmed path and the second robot has moved along the second programmed path.

10. The method of claim 9, further comprising the step of releasing the unoccupied portion of the common space for a further programmed path.

11. The method of claim 7, further comprising the step of transferring the coordinates of at least one of the first portion and the second portion to at least one controller, the controller configured to generate a voxel model from the coordinates.

12. The method of claim 7, wherein a robot controller conducts the steps of determining if the overlap exists between the first portion and the second portion of the common space.

13. The method of claim 7, wherein the movement of one of the first robot and the second robot if overlap exists is determined by a priority value.

14. The method of claim 7, wherein one of the first programmed path and the second programmed path is provided by a single motion statement in a sequence of instructions having multiple motion statements.

15. The method of claim 7, wherein one of the first programmed path and the second programmed path is provided by a plurality of motion statements.

16. The method of claim 7, wherein at least one of the first portion and the second portion of the common space includes a space occupied by at least one of a tooling attached to at least one of the first robot and the second robot and a dressout attached to at least one of the first robot and the second robot.

17. The method of claim 7, wherein the step of determining the overlap also includes determining overlap with a third portion of the common space occupied by an obstacle.

18. The method of claim 7, wherein at least one of the first robot and the second robot having a plurality of programmed paths, the method further comprising the step of analyzing the plurality of programmed paths for the existence of overlap causing a deadlock condition.

19. The method of claim 18, wherein an operating sequence of the plurality of programmed paths is adjusted to militate against the deadlock condition.

20. A method of avoiding collisions in a workcell containing multiple robots, the method comprising the steps of:

providing at least one common space within the workcell that is selectively occupied by a first robot and a second robot, the first robot and the second robot in communication with at least one controller;

determining a first portion of the common space that is occupied during a movement of the first robot along a first programmed path;

representing the first portion as a first voxel model on the controller;

determining a second portion of the common space that is occupied during a movement of a second robot along a second programmed path;

representing the second portion as a second voxel model on the controller, wherein the common space is represented by a voxel model and has both an occupied portion defined by the volume of the common space occupied by the first and second voxel models of the first and second robots and an unoccupied portion defined by a volume of the common space not occupied by the first and second voxel models of the first and second robots, and wherein voxels of the first and second voxel models are voxels in the voxel model of the common space;

comparing the first voxel model and the second voxel model to determine if an overlap exists therebetween;

one of:

moving only one of the first robot along the first programmed path or the second robot along the second programmed path, if there is overlap between the first voxel model and the second voxel model of the common space; and moving the first robot along the first programmed path and moving the second robot along the second programmed path, if there is no overlap between the first voxel model and the second voxel model of the common space;

determining an unoccupied portion of the common space after at least one of the first robot has moved along the first programmed path and the second robot has moved along the second programmed path; and releasing the unoccupied portion of the common space for a further programmed path.

* * * * *